United States Patent
Kunz

(10) Patent No.: US 9,104,846 B2
(45) Date of Patent: Aug. 11, 2015

(54) ACCESS PROVISIONING VIA COMMUNICATION APPLICATIONS

(75) Inventor: Michael Kunz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1108 days.

(21) Appl. No.: 12/025,792

(22) Filed: Feb. 5, 2008

(65) Prior Publication Data

US 2009/0199269 A1 Aug. 6, 2009

(51) Int. Cl.
*G06F 21/31* (2013.01)
*H04L 29/06* (2006.01)

(52) U.S. Cl.
CPC ............. *G06F 21/31* (2013.01); *H04L 63/08* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 7,305,350 B1* | 12/2007 | Bruecken ...................... 705/346 |
| 2003/0007200 A1 | 1/2003 | McIntyre |
| 2004/0059672 A1* | 3/2004 | Baig et al. ...................... 705/40 |
| 2004/0172419 A1 | 9/2004 | Morris et al. |
| 2004/0172451 A1* | 9/2004 | Biggs et al. ................. 709/206 |
| 2004/0215534 A1* | 10/2004 | Gautier et al. ................. 705/30 |
| 2005/0055232 A1* | 3/2005 | Yates ............................. 705/1 |
| 2005/0065979 A1 | 3/2005 | Vachovsky |
| 2005/0154608 A1 | 7/2005 | Paulson et al. |
| 2005/0160183 A1 | 7/2005 | Valli et al. |
| 2005/0246278 A1 | 11/2005 | Gerber et al. |
| 2006/0004703 A1 | 1/2006 | Spivack et al. |
| 2006/0048186 A1 | 3/2006 | Alterman |
| 2006/0136559 A1 | 6/2006 | Morris |
| 2006/0155750 A1* | 7/2006 | Fowler et al. ................. 707/102 |
| 2006/0167940 A1* | 7/2006 | Colton et al. ............. 707/104.1 |
| 2007/0033637 A1* | 2/2007 | Yami et al. ........................ 726/2 |
| 2007/0064121 A1* | 3/2007 | Issa et al. .................... 348/231.2 |
| 2007/0157114 A1* | 7/2007 | Bishop et al. ................. 715/787 |
| 2007/0226368 A1 | 9/2007 | Strickland |
| 2008/0028017 A1* | 1/2008 | Garbow et al. ............. 709/201 |
| 2008/0147821 A1* | 6/2008 | Dietrich et al. ............. 709/216 |
| 2008/0189293 A1* | 8/2008 | Strandel et al. ................. 707/10 |

OTHER PUBLICATIONS

"Windows Live Messenger" http://www.microsoft.com/presspass/newsroom/msn/factsheet/WLMessengerFS.mspx.
Sarvas; et al., "MobShare: Controlled and immediate sharing of mobile images", pp. 724-731.

* cited by examiner

*Primary Examiner* — Alexander Lagor

(74) *Attorney, Agent, or Firm* — Aneesh Mehta; Kate Drakos; Micky Minhas

(57) ABSTRACT

Described herein is technology for, among other things, provisioning access to shared resources. It involves various techniques for creating accounts for recipients of communications with shared resources. Further, the resources may available by an easy to find permanent location (e.g., URL). Such a provisioning process facilitates the growth of the network as recipients are given fully featured accounts. Therefore, the technology avoids the sign up process that users would otherwise have to go through in order to access the shared resource.

20 Claims, 5 Drawing Sheets

ACCESS PROVISIONING VIA COMMUNICATION APPLICATIONS

BACKGROUND

The widespread use and increasing development of the internet has allowed exchanges of information in ways previously not possible. Correspondingly, computer users are sharing information facilitated by technology advances such as digital cameras. For example, a user may upload pictures taken with a digital camera to a photo sharing website in order to share the photos with others.

Typically, users are required to sign up and create an account on the system hosting the shared resource. The sign up process often contains numerous forms or pages which the user must complete and quickly becomes laborious. Further, any errors in data entry can require user correction and lengthen the sign up process.

Other conventional solutions for restricting access to resources have significant disadvantages. One such solution is to provide a unique location (e.g., URL) or temporary account. A user wishing to access the resource is required to have the unique location or temporary account information. When the unique location is contained in an email, the email may be deleted or lost among a large group of emails, resulting in the user being unable to access the resource. Similarly, a temporary account may expire and leave the user with no access to the resource.

Thus, what is needed is a way to provide access to restricted resources without requiring a laborious signup process, unique location, or temporary account.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, provisioning access to shared resources. It involves various techniques for creating accounts for recipients of communications with shared resources. Further, the resources may be available by an easy to find permanent location (e.g., URL). Such a provisioning process facilitates the growth of the network as recipients are given fully featured accounts. Therefore, the technology avoids the sign up process that users would otherwise have to go through in order to access the shared resource.

In one implementation, a method for provisioning access may be used to create accounts based on a communication referencing a shared resource. The recipients of the communication may be checked to see if each recipient has an account for accessing a shared resource. Accounts may then be generated for those recipients without accounts. The communication to those recipients may then be modified to include information corresponding to the newly created account. Thus, the recipients are able to securely access the shared resource without having to go through a formal signup process.

Techniques described herein provide a way for the adding of users to a network or service without an involved signup process. Thus, users are able easily share and access resources in a more efficient manner.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
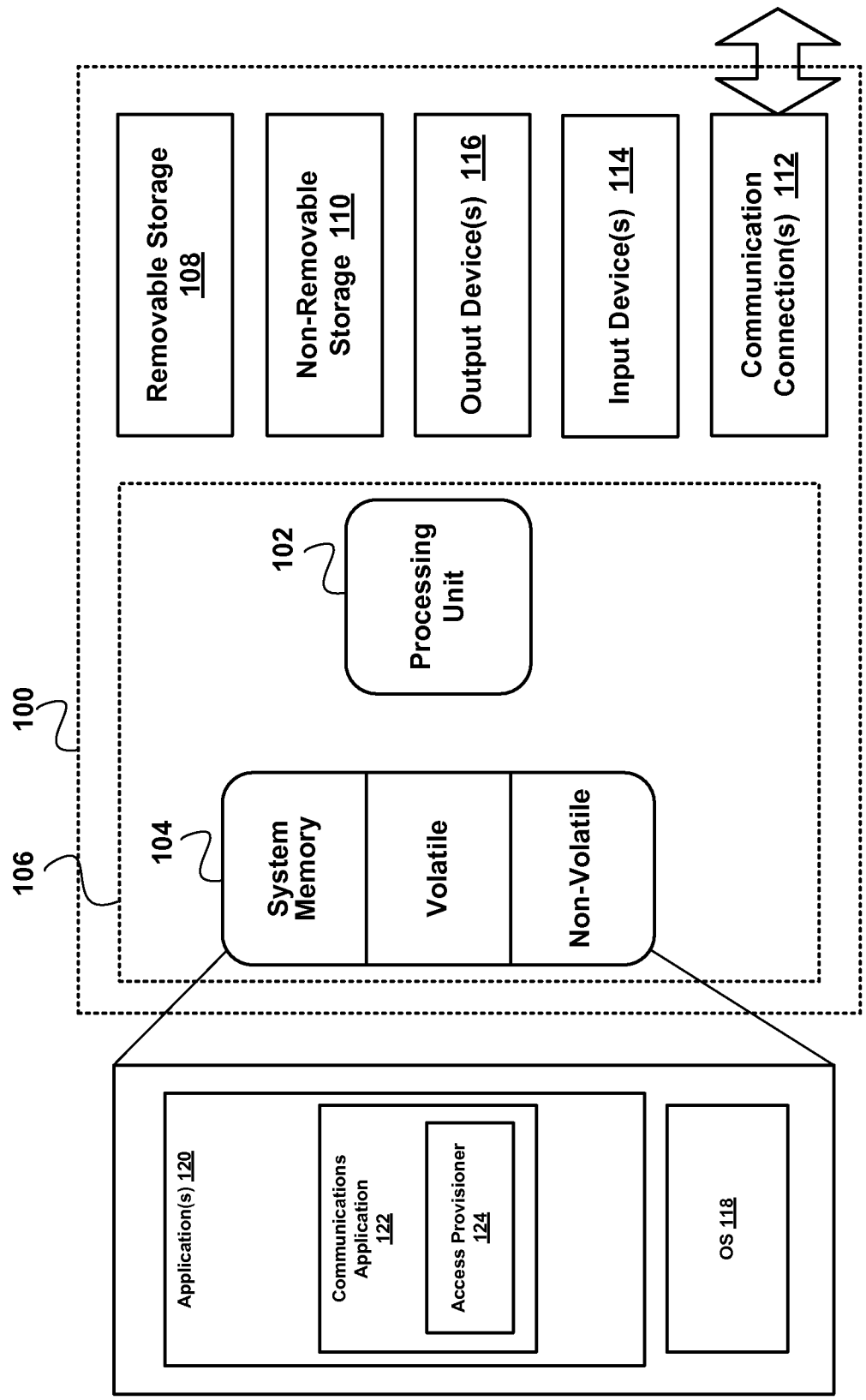
FIG. 1 is a block diagram of an exemplary computing system environment for implementing an embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

Described herein is technology for, among other things, provisioning access to shared resources. It involves various techniques for creating accounts for recipients of communications with shared resources. Further, the resources may be made available by an easy to find permanent location (e.g., URL). Such a provisioning process facilitates the growth of the network as recipients are given fully featured accounts. Therefore, the technology avoids the sign up process that users would otherwise have to go through in order to access the shared resource.

In one implementation, a method for provisioning access may be used to create accounts based on a communication referencing a shared resource. The recipients of the communication may be checked to see if each recipient has an account for accessing a shared resource. Accounts may then be generated for those recipients without accounts. The communication to those recipients may then be modified to include information corresponding to the newly created account. Thus, the recipients are able to securely access the shared resource without having to go through a formal signup process.

Techniques described herein provide a way for the adding of users to a network or service without an involved signup process. Thus, users are able easily share and access resources in a more efficient manner.

Example Operating Environments

With reference to FIG. 1, an exemplary system for implementing embodiments includes a general purpose computing system environment, such as computing system environment 100. Computing system environment 100 may include, but is not limited to, desktop computers, laptops, tablet PCs, mobile devices, and smartphones. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106.

System memory 104 may include, among other things, Operating System 118 (OS), application(s) 120, and communication application 122. Communication application 122 may facilitate communication between users (e.g., sending email, instant messages, and the like) which can include communications referencing shared resources. Communications application 122 may further include access provisioner 124. Access provisioner 124 facilitates the provisioning of access to recipients of communications without accounts to access a shared resource. For example, users without accounts on a system or network hosting photographs may have accounts generated based on an email referencing the photos.

Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 112 may allow computing system environment 100 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 100 may also have input device(s) 114 such as a keyboard, mouse, pen, voice input device, touch input device, remote control, etc. Output device(s) 116 such as a display, speakers, etc. may also be included. All these devices are well known in the art and need not be discussed at length here.

Example System

Figure 2:
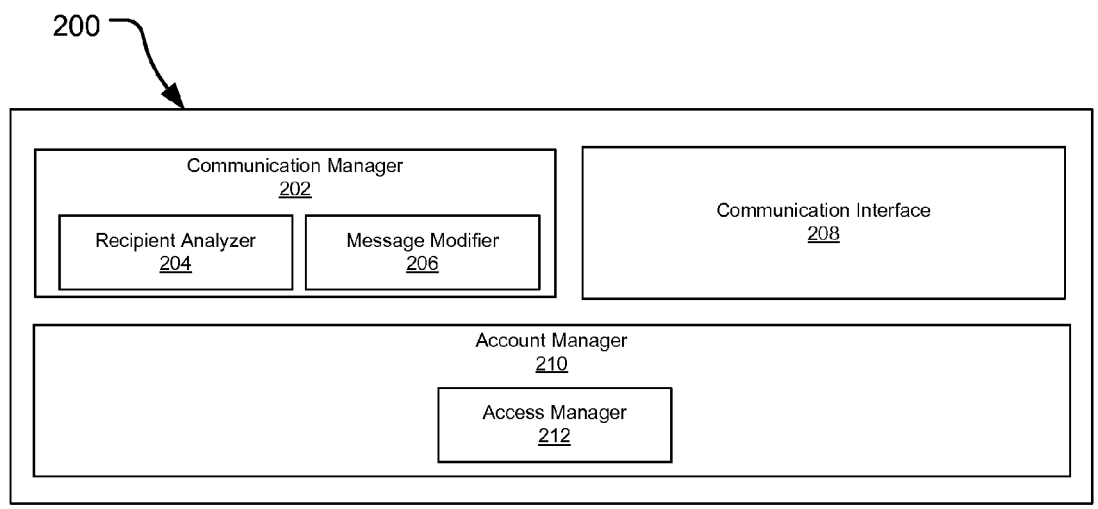
FIG. 2 is a block diagram of an exemplary system for facilitating access to shared resources in accordance with an embodiment.

The following discussion sets forth details of the present technology systems for network communication management. FIG. 2 illustrates example components used by various embodiments of the present technology. System 200 includes components or modules that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. It should be appreciated that the aforementioned components of system 200 can be implemented in hardware or software or in a combination of both. Although specific components are disclosed in system 200 such components are examples. That is, embodiments are well suited to having various other components or variations of the components recited in system 200. It is appreciated that the components in system 200 may operate with other components than those presented, and that not all of the components of system 200 may be required to achieve the goals of system 200.

FIG. 2 shows a block diagram of an exemplary system 200 for facilitating access to shared resources, in accordance with an embodiment. System 200 includes communication manager 202, communication interface 208 and account manager 210. Communication manager 202 may include recipient analyzer 204 and message modifier 206. Account manager 210 may include access manager 212.

Communication interface module 208 facilitates the initiation of a variety of communications, including those related to shared resources and to network services (e.g., email systems, social networks, and the like). For example, communication interface module 208 may facilitate sending emails, blog entries, social network communications and the like via a graphical user interface. The graphical user interface may be a web based interface (e.g., operable to be access via a web browser) or a local application (e.g., email program, personal information manager (PIM), or the like).

Communication manager 202 receives and sends communications including those related to shared resources. Communication manager 202 may alter communications for recipients without accounts for accessing the shared resources. Communication manager 202 may receive and send a variety of communications including, but not limited to, emails, instant messages, web log (blog) entries, and social network communications. The shared resources may be a variety of resources including network shares, internet resources (e.g., accessible via a web browser), and the like. For example, communication manager 202 may receive an email to be sent to a group of friends including a link to a photo album. The email may include an initial or temporary password to be used for accessing the photo album.

Communication manager 202 may include recipient analyzer 204 which analyzes the recipients to determine whether the recipient has an account for accessing the shared resource. Referring to the above example, an email message is sent the recipient list (e.g., "To line" of an email or address) is checked for existing accounts on the system.

Account manager 210 manages accounts for accessing shared resources. Account manager 210 may create accounts for recipients without accounts for accessing the shared resource. In one embodiment, account manager 210 automatically creates authentication accounts using the email addresses of recipients as usernames. The accounts created may be fully featured accounts and able to access other services available to users who have completed a sign up process in addition to the shared resource referenced in the communication.

Account manager 210 may include access manager 212 for managing passwords. Access manager 212 may receive the initial password provided within a communication or separately and set the password for the corresponding account. Access manager 212 may further invoke a prompt for changing the initial password upon a request to access the shared resource via a newly created account.

Referring back to communication manager 202, communication manager 202 may further include message modifier 206. Based on the analysis by recipient analyzer 204, message modifier 206 alters the communications to include account access information (e.g., login and password) corresponding to those recipients without accounts. For example, an email may be altered to include a link with login information or login information in plain text (e.g., username: XYZ, password: pwd).

After receiving the modified communication, the recipient or user may then login with the username (e.g., email address) and temporary password within the modified communication. In one embodiment, the user will then be prompted to change the temporary password to one of his/her choosing. The user may then be granted access to the shared resource (e.g., photos) and optionally informed that their account is a fully featured account able to access the entire suite of services available via the system or network. For example, the user may be able to access more than just photo resources (e.g. albums), including blogs, social networks, and communicate via the network (e.g., with the user sharing the content). For example, when a user accesses a group of photos, he/she can be informed that the owner of the photos is online and can be instant messaged.

Example Operations

Figure 3:
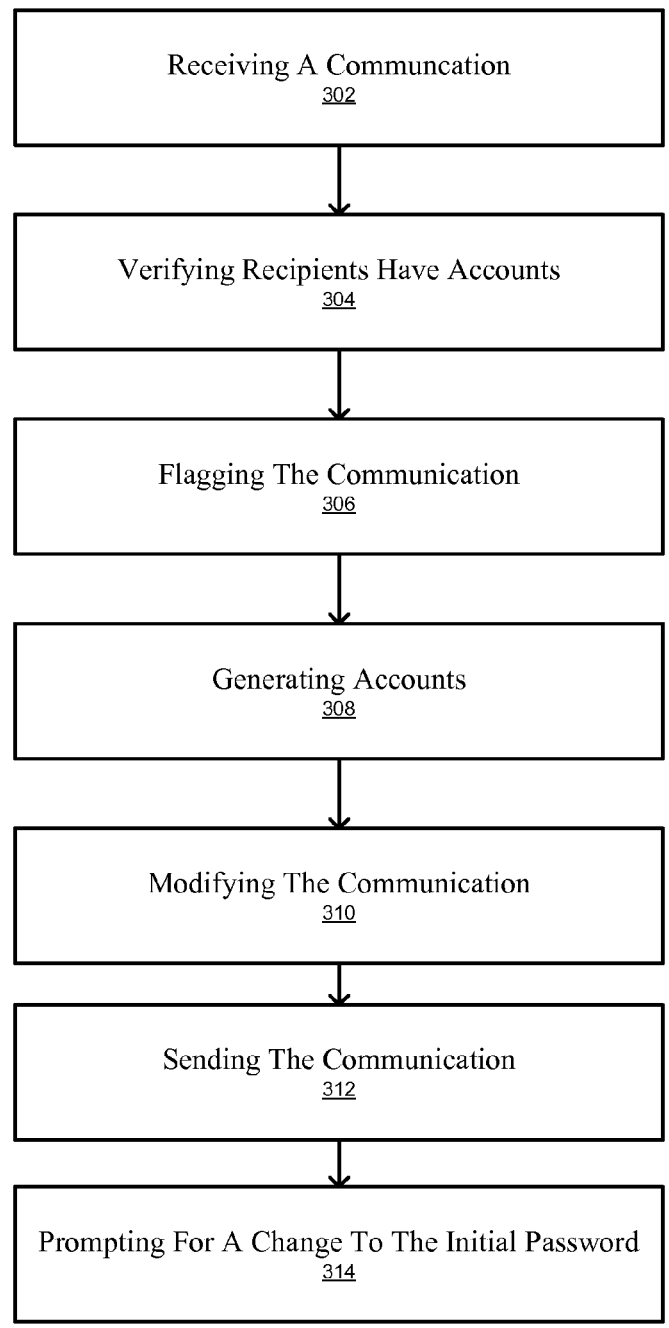
FIG. 3 is a flowchart of an exemplary process for provisioning access to shared resources, in accordance with an embodiment.
Figure 5:
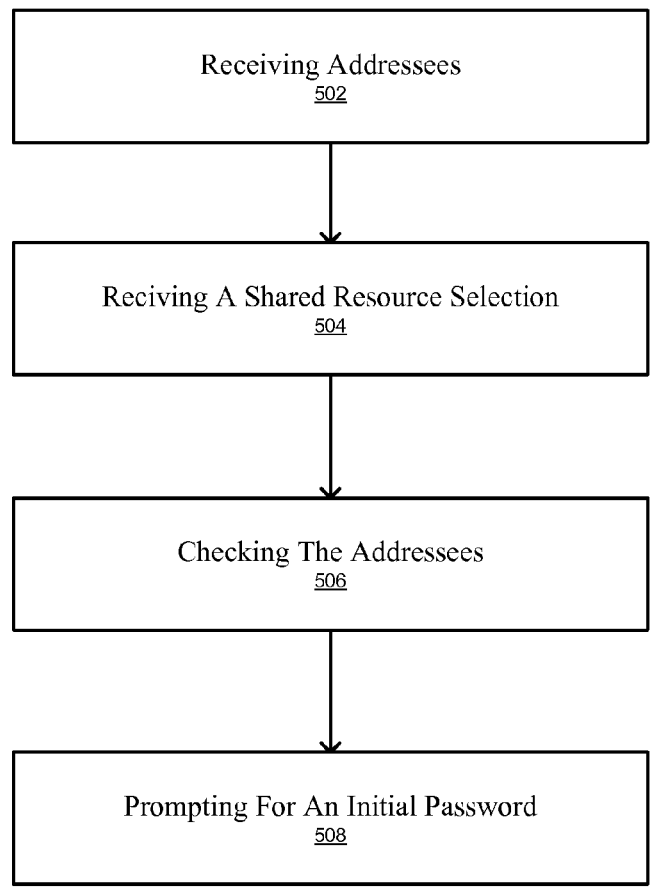
FIG. 5 is a flowchart of an exemplary process for displaying on a display device a communication interface, in accordance with an embodiment.

The following discussion sets forth in detail the operations of the present technology for network communication management. With reference to FIGS. 3 and 5, flowcharts 300 and 500 each illustrate example blocks used by various embodiments of the present technology. Flowcharts 300 and 500 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific blocks are disclosed in flowcharts 300 and 500 such blocks are examples. That is, embodiments are well suited to performing various other blocks or variations of the blocks recited in flowcharts 300 and 500. It is appreciated that the blocks in flowcharts 300 and 500 may be performed in an order different than presented, and that not all of the blocks in flowcharts 300 and 500 may be performed.

FIG. 3 is a flowchart 300 of an exemplary process for provisioning access to shared resources, in accordance with an embodiment. The process of flowchart 300 may be carried out by a system (e.g., system 200) and provide access to a system, network, or service with a variety of services (e.g., email, instant messaging, blogs, social networks, and the like).

At block 302, a communication is received. The communication can include a plurality of recipients and a shared resource to be accessed by the recipients. It is appreciated that a communication can include one or more recipients. For example, an email may be received which includes a "To line"

with multiple email addresses or recipients and a link to a photo album hosted on a photo sharing service to accessed by the recipients. The communication may also include an initial or temporary password to be used for accessing the shared resource by recipients who do not currently have accounts with the service or system providing access to the shared resource.

At block 304, whether each of the recipients has an account for accessing the shared resource is verified. For example, the verification may be based on the domain of an email address (e.g., xyz.com).

At block 306, the communication is flagged. The communication may be flagged when at least one of the plurality of recipients is without or does not have a corresponding account for accessing the shared resource.

At block 308, accounts are generated for recipients without accounts for accessing the shared resource. The username of the accounts can be generated based on an email address (e.g., the username is set to the email address or the portion of the email address before the @ sign). The password of the newly created accounts may be set to the initial temporary password included in the communication. The accounts generated may be fully featured accounts which allow a user access across the suite of services provided by the system with the shared resource. Advantageously, advertisements may be targeted toward the accounts generated based on the shared resources accessed with the account. This allows a more relevant and engaging experience for the user without the need for a laborious sign up process.

It is appreciated, new accounts can also be created from partners or other sources (e.g., other networks or service providers). It is further appreciated that the communication may also be used to determine who has accessed the shared resource. For example, if a content owner sends a communication to close friends, the shared resource may be made accessible only to them.

At block 310, the communication corresponding to the recipients without an account for accessing the shared resource is modified. The communication is modified to include information for accessing the shared resource. For example, the communication may be modified to include the username of the newly created account and the initial password set on the new account. The communication for recipients previously had accounts may be modified to remove the initial password.

At block 312, the communication is sent to the recipients. Recipients may then use the communication (e.g., a link within the communication) to initiate access to the shared resource.

At block 314, a recipient requesting access to the shared resource is prompted to change the initial password. For example, the recipients accessing newly created accounts may be prompted to change the initial password for security purposes.

Figure 4:
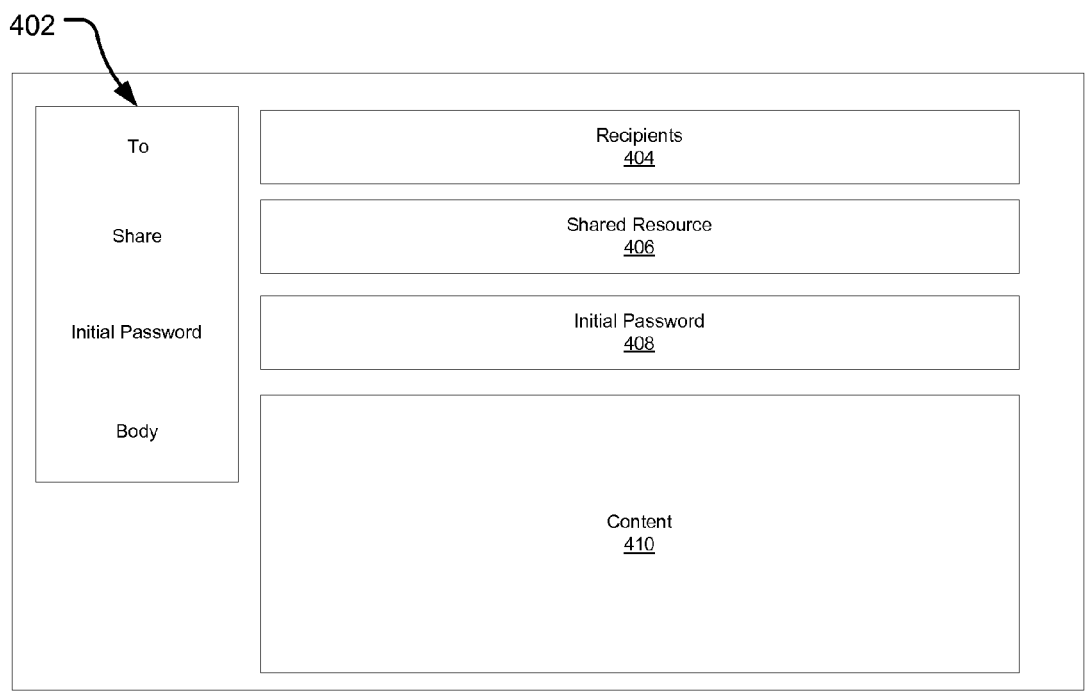
FIG. 4 is a block diagram of an exemplary graphical user interface, in accordance with an embodiment.

FIG. 4 is a block diagram 400 of an exemplary graphical user interface in accordance with one embodiment. Exemplary graphical user interface 400 may be presented after a user has been successfully authenticated and used to initiate communications referencing shared resources. For example, exemplary graphical user interface may be accessed or presented via web browser after logging in. Exemplary graphical user interface 400 includes labels 402, recipients field 404, shared resource field 406, initial password field 408, and content field 410. It is appreciated that exemplary graphical user interface 400 may be used in a variety of applications including, but not limited to, email applications (e.g., local or web based), instant messaging, blogs, and social networks.

Graphical user interface 400 facilitates a user selecting one or more recipients or addresses (e.g., email addresses) via recipients field 404 to receive the communication. While composing the communication, the user may select a resource (e.g., photos or videos on a network share or website) to share with the recipients via shared resource field 406. The user may further select an initial or temporary password to be used to access the shared resource for users who do not currently have an account on the system or site hosting the shared resource via initial password field 408. The user may also further add content related to the communication via content field 410 (e.g., a title of "New Years Photos").

It is appreciated the exemplary graphical user interface 400 may not display all fields and labels until certain fields are set. For example, the initial password field 408 may displayed after a user has selected a selected resource in shared resource field 406. As another example, initial password field 408 may be displayed as soon as a user has selected a shared resource and enters a recipient who does not currently have an account for accessing the shared resource in recipients field 404.

FIG. 5 is a flowchart 500 of an exemplary process for displaying on a display device a communication interface, in accordance with an embodiment. The process of flowchart 500 may be carried out in conjunction with a graphical user interface (e.g., graphical user interface 400). The communication interface of flowchart 500 may be presented via a variety of applications including, but not limited to, web browser or a local executing application (e.g., desktop client software). The process of flowchart 500 may also be invoked or otherwise executed via an application programming interface (API). It is appreciated that the API could be used to access a part of a variety of communication services (e.g., email service, web hosting services, file hosting service, etc.).

At block 502, one or more addressees is received. The addressees may be selected from a contacts list or typed in by a user. The addresses or recipients may be entered into a recipients field (e.g., a "To line" of an email application or recipient field 404).

At block 504, a selection of a resource to be accessed by the one or more addressees is received. A resource may be a service of a network or system (e.g., email system, photo sharing network) or a shared resource (e.g., photo album) as described herein. The resource may further be a variety of information or data including but not limited to, photos, videos, and documents. The selection of a resource may be used to invite another to the network or system.

At block 506, whether the addressees have accounts for accessing the resource is checked. The addresses may be checked dynamically as the addressees are received or selected. For example, as a user selects or enters each addressee, the addressee is checked and those addressees without accounts may be visually flagged (e.g., a red underline) or marked.

At block 508, a prompt for an initial password for access to the resource is presented. The initial password can be used for addressees without an account to access the selected resource. For example, upon an addressee being entered who does not have an account, the user may be prompted for an initial password.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for provisioning access to shared resources, comprising:
    receiving, at a server configured to provision access to shared resources, a first communication comprising an email from a user attempting to share a shared resource with one or more recipients, the first communication comprising a password for accessing the shared resource;
    comparing the one or more recipients to a list of account holders having access to the shared resource;
    determining, via one or more processing units, responsive to the comparing, that a first recipient of the one or more recipients does not have an account for accessing the shared resource;
    generating, via one or more processing units, responsive to the determining, a first account for the first recipient, the first account associated with a first username and the password comprised in the first communication;
    modifying at least some of the first communication into a modified first communication for distribution to the first recipient, the modified first communication comprising the first username and the password;
    determining, responsive to the comparing, that a second recipient of the one or more recipients has an account for accessing the shared resource; and
    modifying at least some of the first communication into a modified second communication for distribution to the second recipient, the modified second communication not comprising the password.

2. The method of claim 1, comprising:
    sending at least some of the modified first communication to the first recipient but not to the second recipient.

3. The method of claim 1, comprising prompting the first recipient to change the password responsive to the first recipient accessing the shared resource via the modified first communication.

4. The method of claim 1, the shared resource comprising a network share.

5. The method of claim 1, the first username based at least in part on a portion of an email address comprised in the first communication.

6. The method of claim 1, an identifier for the first recipient, comprised in the first communication, comprising an email address associated with the first recipient.

7. A computer readable storage device comprising computer executable instructions which when executed perform a method, comprising:
    receiving, at a server configured to provision access to shared resources, a first communication from a user attempting to share a shared resource with one or more recipients, the first communication comprising a password for accessing the shared resource;
    comparing the one or more recipients to a list of account holders having access to the shared resource;
    determining, via one or more processing units, responsive to the comparing, that a first recipient of the one or more recipients does not have an account for accessing the shared resource;
    generating, via one or more processing units, responsive to the determining, a first account for the first recipient, the first account associated with a first username and the password comprised in the first communication;
    modifying at least some of the first communication into a modified first communication for distribution to the first recipient, the modified first communication comprising the first username and the password;
    determining, responsive to the comparing, that a second recipient of the one or more recipients has an account for accessing the shared resource; and
    modifying at least some of the first communication into a modified second communication for distribution to the second recipient, the modified second communication not comprising the password.

8. The computer readable storage device of claim 7, the shared resource comprising a network share.

9. The computer readable storage device of claim 7, the method comprising sending at least some of the modified first communication to the first recipient but not to the second recipient.

10. The computer readable storage device of claim 7, the first communication comprising an email.

11. The computer readable storage device of claim 7, the first username based at least in part on a portion of an email address comprised in the first communication.

12. The computer readable storage device of claim 7, the first communication comprising a social network communication.

13. The computer readable storage device of claim 7, the first communication comprising a blog entry.

14. The computer readable storage device of claim 7, the shared resource comprising an internet resource.

15. The computer readable storage device of claim 7, the method comprising prompting the first recipient to change the password responsive to the first recipient accessing the shared resource via the modified first communication.

16. A system comprising:
    one or more processing units; and
    memory comprising instructions that when executed by at least some of the one or more processing units, perform operations comprising:
        receiving, at a server configured to provision access to shared resources, a first communication comprising a first email from a user attempting to share a shared resource with one or more recipients, the first communication comprising a password for accessing the shared resource;
        comparing the one or more recipients to a list of account holders having access to the shared resource;
        determining, via one or more processing units, responsive to the comparing, that a first recipient of the one or more recipients does not have an account for accessing the shared resource;
        generating, via one or more processing units, responsive to the determining, a first account for the first recipient, the first account associated with a first username and the password comprised in the first communication;
        modifying at least some of the first communication into a modified first communication for distribution to the first recipient, the modified first communication comprising the first username and the password;
        determining, responsive to the comparing, that a second recipient of the one or more recipients has an account for accessing the shared resource; and
        modifying at least some of the first communication into a modified second communication for distribution to the second recipient, the modified second communication not comprising the password.

17. The system of claim 16, the operations comprising sending at least some of the modified first communication to the first recipient but not to the second recipient.

18. The system of claim 16, the first username based at least in part on a portion of an email address comprised in the first communication.

19. The system of claim 16, the operations comprising prompting the first recipient to change the password responsive to the first recipient accessing the shared resource via the modified first communication.

20. The system of claim 16, the shared resource comprising at least one of a network share or an internet resource.

* * * * *